United States Patent [19]

Fahey et al.

[11] 4,301,515

[45] Nov. 17, 1981

[54] VARIABLE TIMING SYSTEM

[75] Inventors: Robert J. Fahey, Framingham; Robert A. Norbedo, North Andover; Martin L. Resnick, Chestnut Hill, all of Mass.

[73] Assignees: GTE Products Corp., Stamford, Conn.; GTE Laboratories Inc., Waltham, Mass.

[21] Appl. No.: 94,246

[22] Filed: Nov. 14, 1979

[51] Int. Cl.³ .............................................. G06F 1/00
[52] U.S. Cl. .................................................. 364/900
[58] Field of Search ... 364/200 MS File, 900 MS File; 179/5 P; 340/526, 539

[56] References Cited

U.S. PATENT DOCUMENTS

| | | | |
|---|---|---|---|
| 3,124,674 | 3/1964 | Edwards et al. | 364/900 |
| 3,651,471 | 3/1972 | Haselwood et al. | 364/900 |
| 3,662,111 | 5/1972 | Rubinstein | 179/5 P |
| 3,715,728 | 2/1973 | Fontaine et al. | 364/200 |
| 3,833,895 | 9/1974 | Fecteau | 340/539 |
| 3,885,235 | 5/1975 | Bergstrom et al. | 340/526 |
| 3,925,763 | 12/1975 | Wadhwani et al. | 340/539 |
| 3,989,900 | 11/1976 | Dibner | 179/5 P |
| 4,057,790 | 11/1977 | Fleming et al. | 340/539 |

OTHER PUBLICATIONS

"AWA Automatic Warning Aid-In Invention to Benefit Old and Handicapped People", (undated)-Brochure-17 pp.

AWA Alarm System, (undated)-Brochure-11 pp. with Cover Letter and Price List.
The De Mey Medical Monitoring System, (undated)-Descriptive Material-6 pp.

Primary Examiner—Harvey E. Springborn
Attorney, Agent, or Firm—Peter Xiarhos

[57] ABSTRACT

A variable timing system including a remote control unit employed in the residence of an individual and interconnected with a centralized communication system by a telephone network. The remote control unit includes a plurality of storage devices arranged to store count data for use by the remote control unit in the performance of its operations and representing particular periods of time. The centralized communications center includes a disc storage unit which is also arranged to store count data therein representing particular periods of time. An operator-controlled unit at the communications center may be used in conjunction with a computer to selectively vary the value of any one or more of the count data stored in the disc unit thereby to correspond to increased or decreased periods of time. Under prescribed conditions the remote control unit operates to establish communication with the communications center for the purpose of transmitting specified data to the communications center. Upon establishing this communication, the computer operates to extract from the disc storage unit the various count data stored therein and to communicate the count data back to the remote control unit. The count data is then stored in the appropriate storage devices of the remote control unit for use by the remote control unit.

33 Claims, 1 Drawing Figure

VARIABLE TIMING SYSTEM

CROSS-REFERENCE TO RELATED APPLICATIONS

The present application discloses subject matter which is disclosed, and claimed, in the following co-pending applications:

Ser. No. 965,808, filed Dec. 4, 1978, now U.S. Pat. No. 4,224,478, in the names of Robert J. Fahey and Martin L. Resnick, entitled "DATA TRANSMISSION CIRCUIT", and assigned to GTE Sylvania Incorported and GTE Laboratories Incorporated;

Ser. No. 965,809, filed Dec. 4, 1978, now U.S. Pat. No. 4,220,825, in the name of Robert J. Fahey, entitled "TELEPHONE STATUS MONITOR CIRCUIT", and assigned to GTE Sylvania Incorporated;

Ser. No. 965,756, filed Dec. 4, 1978, now U.S. Pat. No. 4,224,602, in the names of Richard W. Anderson and Alfred I. Bottner, entitled "SIGNALLING DEVICE", and assigned to GTE Sylvania Incorporated;

Ser. No. 973,201, filed Dec. 26, 1978, now U.S. Pat. No. 4,220,872, in the name of Robert J. Fahey, entitled "D.C. POWER SUPPLY CIRCUIT", and assigned to GTE Sylvania Incorporated;

Ser. No. 973,218, filed Dec. 26, 1978, now U.S. Pat. No. 4,225,792 in the name of Robert J. Fahey, entitled "DETECTOR CIRCUIT", and assigned to GTE Sylvania Incorporated;

Ser. No. 75,782, filed Sept. 17, 1979, in the name of Richard L. Naugle, entitled "SENSING APPARATUS", and assigned to GTE Laboratories Incorporated;

Ser. No. 75,769, filed Sept. 17, 1979, in the names of Richard L. Naugle and William L. Geller, entitled "EXIT-ENTRY APPARATUS", and assigned to GTE Laboratories Incorporated;

Ser. No. 94,015, filed concurrently herewith, in the names of Jeffrey R. Fox, Arthur Margolies, Rob Moolenbeek and Martin L. Resnick, entitled "APPARATUS FOR MONITORING AND SIGNALLING SYSTEM", and assigned to GTE Laboratories Incorporated;

Ser. No. 94,018, filed concurrently herewith, in the names of Richard W. Anderson, J. Edward Schlener and Martin L. Resnick, entitled "APPARATUS FOR MONITORING AND SIGNALLING SYSTEM", and assigned to GTE Sylvania Incorporated and GTE Laboratories Incorporated;

Ser. No. 94,013, filed concurrently herewith, in the names of Richard W. Anderson and J. Edward Schlener, entitled "APPARATUS FOR MONITORING AND SIGNALLING SYSTEM", and assigned to GTE Sylvania Incorporated;

Ser. No. 94,012, filed concurrently herewith, in the names or Robert J. Fahey and Martin L. Resnick, entitled "TELEPHONE STATUS MONITOR APPARATUS", and assigned to GTE Sylvania Incorporated and GTE Laboratories Incorporated;

Ser. No. 94,014, filed concurrently herewith, in the names of Robert J. Fahey and Martin L. Resnick, entitled "APPARATUS FOR MONITORING USAGE OF A TELEPHONE", and assigned to GTE Sylvania Incorporated and GTE Laboratories Incorporated;

Ser. No. 94,245, filed concurrently herewith, in the names of Robert A. Norbedo and Martin L. Resnick, entitled "APPARATUS AND SIGNALLING SYSTEM", and assigned to GTE Laboratories Incorporated;

Ser. No. 94,241, filed concurrently herewith, in the name of Martin L. Resnick, entitled "DATA PROCESSING APPARATUS FOR RECEIVING AND PROCESSING CODED WORDS", and assigned to GTE Laboratories Incorporated;

Ser. No. 94,016, filed concurrently herewith, in the names of Richard W. Anderson, Robert J. Fahey, William R. McClellan, and J. Edward Schlener, entitled "MONITORING AND SIGNALLING SYSTEM", and assigned to GTE Sylvania Incorporated;

Ser. No. 94,017, filed concurrently herewith, in the names of Hans G. Blank and Martin L. Resnick, entitled "APPARATUS FOR COMMUNICATING WITH PROCESSING APPARATUS OVER A TELEPHONE NETWORK", and assigned to GTE Laboratories Incorporated;

Ser. No. 94,243, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated;

Ser. No. 94,019, filed concurrently herewith, in the names of Robert J. Fahey, Robert A. Norbedo and J. Edward Schlener, entitled "APPARATUS FOR MONITORING AND SIGNALLING SYSTEM", and assigned to GTE Sylvania Incorporated and GTE Laboratories Incorporated;

Ser. No. 94,244, filed concurrently herewith, in the names of Robert J. Fahey and Robert A. Norbedo, entitled "APPARATUS FOR SIGNALLING SYSTEM", and assigned to GTE Sylvania Incorporated and GTE Laboratories Incorporated; and Ser. No. 94,242, filed concurrently herewith, in the names of Robert J. Fahey and Martin L. Resnick, entitled "APPARATUS FOR MONITORING AND SIGNALLING SYSTEM", and assigned to GTE Sylvania Incorporated and GTE Laboratories Incorporated;

The following co-pending applications are directed to apparatus which may be employed in the signalling and monitoring system of the present invention:

Ser. No. 75,783, filed Sept. 17, 1979, in the names of Jeffrey R. Fox, Arthur Margolies, and Rob Moolenbeek, entitled "ELECTRICAL POWER SUPPLY APPARATUS", and assigned to GTE Laboratories Incorporated; and Ser. No. 84,976, filed Oct. 15, 1979, in the name of William L. Geller, entitled "DIGITAL COMMUNICATIONS RECEIVER", and assigned to GTE Laboratories Incorporated.

BACKGROUND OF THE INVENTION

The present invention relates to a monitoring and signalling system. More particularly, the present invention relates to a monitoring and signalling system such as a home health care system for monitoring the activities of individuals within their own homes, apartments, etc., and for providing bi-directional communication between these locations and a centralized communications center.

In recent years, as the general population has become older and the number of elderly persons in the population has increased, and also as a result of increased social welfare legislation directed to the needs of these persons, there has been an increased reliance and utilization of professional care institutions such as hospitals, nursing homes and retirement centers for providing health care and maintenance for these individuals. A large majority of these individuals are maintained and cared for in such institutions for good and proper reasons, most typically for the treatment of medical problems requiring medical facilities and equipment and the professional services of doctors, nurses and the like. However, there are a number of individuals who are presently maintained in institutions without medical reason. These individuals generally have no family or friends to care for them or who do not wish to impose upon or burden such family or friends and are prepared to sacrifice some measure of independence for the security and freedom from worry, anxiety, and loneliness that institutions can provide. It has therefore been recognized that if alternatives to institutionalization can be provided, especially for those individuals who do not require constant or continuing institutional attention or observation, while providing a substantial degree of security and independence for these individuals, preferably within their own homes, the burdens on the institutional care system can be reduced and result in lower health care costs. Any such alternatives which would also produce the same results for individuals other than the elderly, such as young handicapped, disabled or infirm adults, would also have the effect of improving the quality of life of such individuals and, at the same time, reducing health care costs.

A variety of apparatus and systems have been proposed heretofore directed to solutions to the problems as discussed hereinabove. One such system, developed in Sweden, is described in U.S. Pat. No. 3,885,235 and is adapted to monitor passively normal, routine activities of an individual in his or her own residence and to produce alarm conditions in the event these routine activities are not performed during some specified period of time, for example, a period of up to 24 hours. The system as described in the patent includes a plurality of actuating units which may be variously located in predetermined areas of the residence, such as halls, lavatories, bathrooms and bedrooms, and which may be associated with apparatus likely to be actuated or used routinely by the individual during the normal course of the day. This apparatus may include, by way of example, lighting circuits, radio sets, television sets and household appliances. Actuation or use of any one of the actuating units during the aforesaid specific time period will cause an electrochemical timer set to this time period to be reset and to repeat its timing cycle. In the event no actuating unit is actuated or used during the time period, for example, due to inactivity or incapacity of the individual, the timer times out after the time period and an alarm condition, for example, in the form of an audible or visual alarm, is produced by the system indicative of this situation. If the alarm condition was produced as the result of inactivity rather than incapacity, the user may disable the system by the use of a master switch. The master switch may also be used to disable the system when the individual leaves his or her residence for a prolonged period of time, for example, for a period of time greater than the time period of the timer. Upon return of the individual, the system is arranged so that routine operation of any one of the actuating units will have the effect of resetting the timer and causing the timer to repeat its timing cycle. The system as described above may also include an alarm switch in the residue for use by the individual in producing alarm conditions during emergencies, such as medical emergencies or accidents.

In a later version of the system as described in the aforementioned U.S. Pat. No. 3,885,235, known as the "Automatic Warning Aid (AWA)", additional features are provided, including a direction sensitive photocell optics arrangement in the bathroom; an electronic timer having two time periods, specifically, a short time period associated with the bathroom optics arrangement and a longer time period associated with all other actuating units; a pre-alarm cycle effective prior to an actual alarm cycle and during which an alarm condition can be cancelled or aborted; and remote alarm transmission. In this later system, recognition is given to the fact that the majority of accidents occur in the bathroom. Accordingly, the system is arranged so that when an individual enters the bathroom the direction sensitive photocell arrangement detects this entry and causes the timing cycle of the electronic timer to be reduced to its short time period, for example, about one hour. If the individual does not exit within the one hour period, for example, due to incapacity or inactivity of the individual, a pre-alarm cycle will be initiated and, if the pre-alarm cycle is not terminated or aborted by the individual, an actual alarm cycle will be initiated after passage of a short period of time (e.g., about ½ hour). In the event the individual exits from the bathroom within the one hour period, the direction sensitive photocell arrangement will detect this exit and cause the timing cycle of the electronic timer to be set or returned to its longer time cycle, for example, about 8 hours. During any pre-alarm cycle caused by non-use of any of the actuating units within the individual's residence the individual may, unless incapacitated, abort or cancel the pre-alarm cycle by actuation or use of any actuating unit (which resets the timer) so that no actual alarm condition will be produced. The alarm condition may be generated locally or, if desired, transmitted over a telephone network, for example, in the form of a recorded message, to a central alarm center from which communication with the individual may be attempted and/or help sent or summoned. for passively monitoring the activities of individuals within their own residences and for producing appropriate alarm conditions is described in U.S. Pat. No. 3,989,900. In this system, the use of a standard telephone is monitored. Each time the handset of the telephone is lifted off or removed from the cradle of the telephone, for example, during the making and receiving of routine telephone calls, a timer set to cycle through a predetermined time period, for example, up to 24 hours, is caused to be reset and to repeat its timing cycle. So long as the telephone is used during the time period of the timer no alarm condition will be produced. If no use of the telephone is made during the time period of the timer, for example, due to incapacity or inactivity of the individual, a local alarm condition is produced and, simultaneously therewith, a magnetic tape player is actuated to dial continuously a plurality of telephone numbers of locations at which help may be available and to transmit a prerecorded message that help is needed at the address of the individual. If the timing out of the timer was due to inactivity rather than incapacity, the user may, in response to the local alarm condition, abort the alarm condition and data transmission sequence (within a time period of about 90 seconds) by simply lifting and replacing the handset back on the cradle of the telephone thereby resetting the timer. This latter operation may also be used to reset the timer at such time as the individual plans to leave his residence for a period of time less than the predetermined time period of the timer. An activating switch is also provided in the system for activation of the alarm condition in the case of emergencies. The abovementioned patent also contemplates the use of a high speed digital dialer and transmitter in place of the aforementioned magnetic tape player. In this case, the timing out of the timer will produce a local alarm condition and, unless the alarm sequence is aborted (for example, within a 5 minute period), the digital dialer and transmitter will operate to seize a telephone line to establish communication with the central station. The dialing of the central station continues until a receiving signal has been received from the central station whereupon an identification signal can be sent to the central station.

In still other systems which have been proposed heretofore for enabling individuals to be maintained within their own residences while providing appropriate alarm signalling in emergency or accident situations, a transmitter is employed by an individual to communicate under a variety of conditions with control apparatus located on the premises. The transmitter, which may be in the form of a small, portable hand held unit or a unit carried in a pocket or purse or attached to clothing or worn as a pendant (e.g., see U.S. Pat. Nos. 4,121,160 and 4,134,108), may be used by the individual to communicate with the control apparatus in a variety of situations, including emergency or accident situations, to respond to periodic check signals or stimuli from the control apparatus as an indication that "all is well" (e.g., see U.S. Pat. No. 3,662,111), or to respond within predetermined time periods of timer apparatus. The signals from the transmitter are typically coded rf signals employed to control circuitry within the control apparatus. Activation of a transmitter in an emergency or accident situation, or failure to activate a transmitter at required times, for example, due to incapacity or inactivity, will ordinarily cause an alarm cycle to be initiated which, if not aborted or cancelled by the individual, will cause an alarm sequence to be initiated for informing others of the emergency, accident or inactivity situation. The alarm sequence may be variously initiated by digital or tape dialers and include one or more messages, identification data, etc., to be communicated, for example, over a telephone network, to such organizations or individuals as an emergency center, the police or fire department, ambulance service, doctors, paramedics, rescue teams, relatives, friends or neighbors. In many systems, repeated attempts will be made to communicate alarm information to a central location using one or more telephone numbers, and some systems may include handshaking operations between a local control unit and central equipment and include test calls for determining proper functioning of the systems.

While the various systems as described above are useful to a degree in alleviating the problems of individuals living alone, they all have serious shortcomings and disadvantages which limit their effectiveness and usefulness. As a group, for example, these systems utilize simple data handling, processing and communication techniques, being limited more or less to tape and digital dialing, the transmission and reception of limited amounts of data, and, in some cases, simple handshaking and parity-checking operations. It is not known, for example, that any of these systems employ computers, microprocessors, or the like capable of performing significant and substantial data processing, either within the residences of individuals or at central locations. As a result, these systems are susceptible to a high false alarm rate and reliability problems, these latter problems being especially exasperated in those systems employing mechanical tape dialers and electromechanical timers and the like. In these systems, therefore, due to the lack of sophisticated data processing and communications, there is inadequate guarantee, if any, that a successful and satisfactory transmission of data, such as alarm conditions or information, has been achieved so that those persons charged with acting on this information can adequately discharge their duties. The systems as described above, perhaps also as a result of their limited data processing and communications capabilities, have limited capability in detecting or pinpointing, and distinguishing between, the malfunction of various critical components thereof, for example, actuating units, control apparatus or telephone lines. In these systems, the malfunction of a critical component thereof will, assuming that such malfunction is somehow communicated to a responsible person (e.g., as a result of an alarm condition), oridinarily require service personnel to enter a person's home and check out the entire system or a major part thereof to pinpoint the particular source of trouble or malfunction. Further, in those systems employing timers having one or more resettable time periods (e.g., a one-hour bathroom cycle and/or a regular 8-hour cycle), these time periods are alterable only within the residences of individuals, thereby requiring costly service calls by service personnel to effect the alterations. The alteration of timer periods only within the residences of individuals can also have the effect of increasing the chances of tampering by these individuals.

In addition to the abovementioned general shortcomings and disadvantages, the systems as described hereinabove have other and more specific shortcomings and disadvantages which limit their effectiveness and usefulness in a home health care environment. For example, in the Swedish systems the multiple actuating units and the alarm switches are hard-wired to the control units. This hard-wiring operation makes the installations of these systems complex, time-consuming and expensive. In addition, while using several diverse "passive" actuating units, the Swedish systems do not make use of a common passive actuating unit generally available and used frequently in most residences, namely, the telephone. While the systems described in U.S. Pat. No. 3,989,900 employ a telephone as a passive actuating unit, no other passive actuating units are employed, thereby reducing the scope of monitoring of the activities of individuals. In addition, only on/hook to off-/hook transitions of the telephone are used to reset the timer in the control unit. Thus, at the conclusion of a telephone conversation the off/hook to on/hook transition resulting from the individual replacing the handset on the cradle of the telephone will not reset the timer, thereby having the probable effect of increasing the alarm rate of the system. In the case of the systems employing rf transmitters for transmitting alarm conditions or responding to predetermined check signals, these systems similarly do not employ passive actuating units and thereby have a reduced scope of monitoring of the activities of individuals and, therefore, a reduced effectiveness.

BRIEF SUMMARY OF THE INVENTION

In accordance with the present invention a variable timing system is provided which may be employed in a home health care system as described hereinabove. The variable timing system includes first and second apparatus at first and second locations, respectively, and interconnected by a transmission medium for allowing bidirectional communication between the first and second apparatus.

The first apparatus at the first location includes a first storage apparatus and a communication apparatus. The first storage apparatus is utilized to store count data therein related to a predetermined period of time and utilized by the first apparatus in the performance of certain operations. The communications apparatus operates under prescribed conditions to establish communication with the second apparatus at the second location over the transmission medium. The second apparatus at the second location includes a second storage apparatus arranged to store count data therein having a value corresponding to a predetermined period of time, and apparatus capable of varying the value of the count data within the second storage apparatus to either increase its value or decrease its value thereby to correspond to an increased or decreased period of time, respectively. An extraction apparatus of the second apparatus operates following the establishing of communication with the second apparatus by the first apparatus to extract from the second storage apparatus the existing count data stored therein and to communicate this count data via the transmission medium to the first apparatus. This count data is received by a count receiving apparatus of the first apparatus and caused to be applied to and stored in the first storage apparatus.

BRIEF DESCRIPTION OF THE DRAWING

Various objects, features and advantages of a monitoring and signalling system in accordance with the present invention will be had from a detailed discussion taken in conjunction with the accompanying drawing in which.

DETAILED DESCRIPTION OF THE INVENTION

Figure 1:
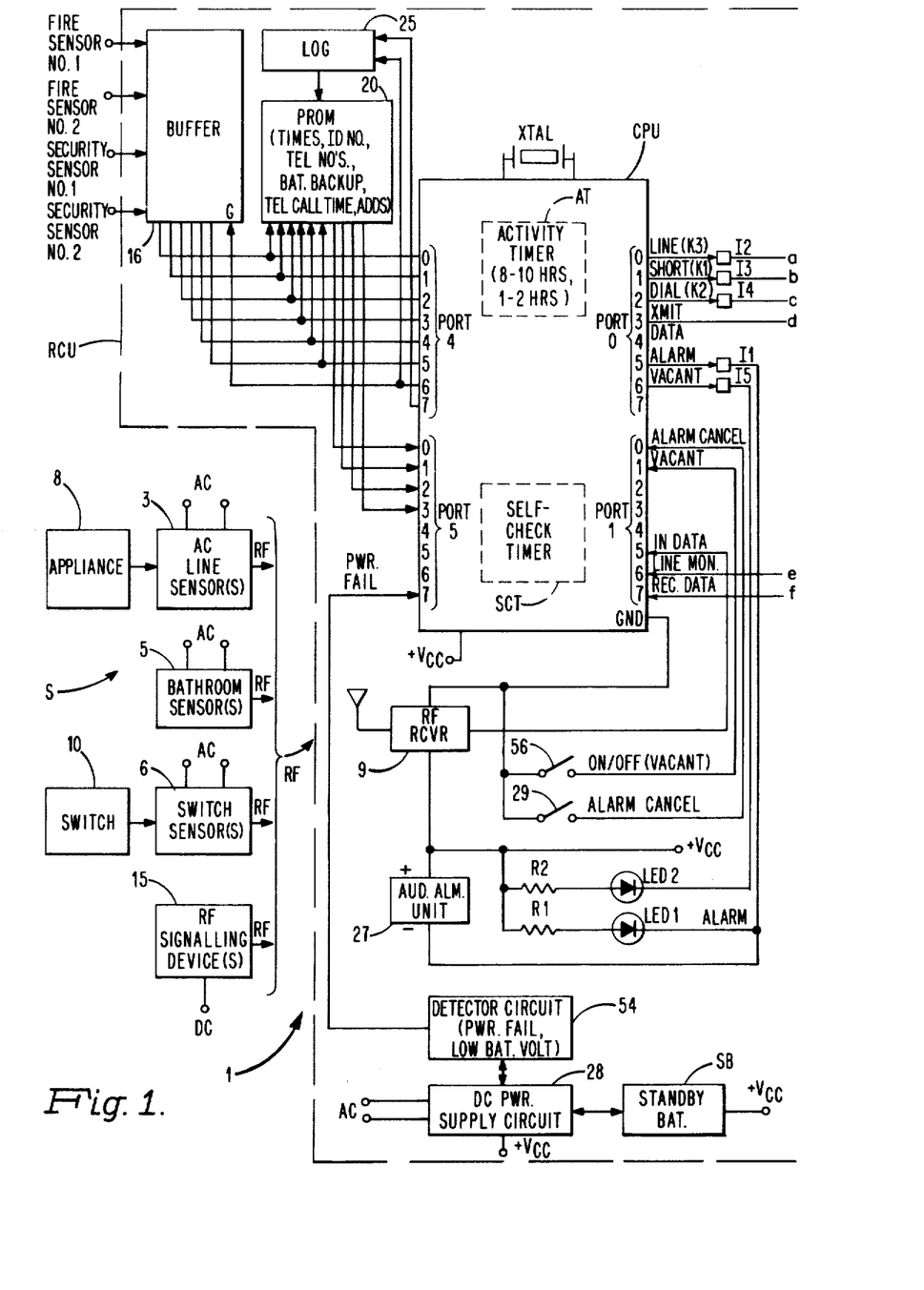
FIG. 1 is a schematic block diagram of a monitoring and signalling system in accordance with the present invention.

The present invention is described in detail in co-pending patent application Ser. No. 094,019, filed Nov. 14, 1979, now U.S. Pat. No. 4,259,548, in the names of Robert J. Fahey, J. Edward Schlener and Robert A. Norbedo. The following portions of that co-pending application are incorporated herein by reference:

(a) FIGS. 2-66 and the corresponding brief description thereof under the heading "BRIEF DESCRIPTION OF THE DRAWING"; and (b) Th entire portion of the specification following the heading "DETAILED DESCRIPTION OF THE INVENTION".

What is claimed is:

1. A variable timing system comprising:
   first and second apparatus at first and second locations, respectively, and interconnected by a transmission medium for allowing bidirectional communication between the first and second apparatus;
   said first apparatus at the first location comprising:
   first storage means for storing count data therein related to a predetermined period of time; and
   communication means operative under prescribed conditions to establish communication with the second apparatus at the second location over the transmission medium;
   said second apparatus at the second location comprising:
   second storage means for storing count data therein having a value corresponding to a predetermined period of time;
   means capable of varying the value of the count data within the second storage means to either increase its value or decrease its value thereby to correspond to an increased or decreased period of time, respectively; and
   extraction means operative following the establishing of communication with the second apparatus to extract from the second storage means the existing count data stored therein and to communicate this count data via the transmission medium to the first apparatus; and
   said first apparatus further comprising:
   count receiving means operative to receive the count data from the second apparatus and to cause the count data to be applied to and stored in the first storage means.

2. A variable timing system in accordance with claim 1 wherein:
   the communication means of the first apparatus at the first location includes message generation means operative under the prescribed conditions to generate message data and means operative to apply the message data to the transmission medium for transmission over the medium to the second apparatus;
   the extraction means of the second apparatus at the second location includes first means arranged to receive the message data from the 1st apparatus, and second means responsive to the first means and operative to extract from the second storage means the existing count data stored therein and to incorporate this count data in message data, and third means operative to apply the message data to the transmission medium for transmission over the transmission medium to the first apparatus; and
   the count receiving means of the first apparatus includes receive means operative to receive the message data from the second apparatus and count extracting means responsive to the receive means and operative to extract the count data from the message data and to apply the count data to the first storage means to be then stored in the first storage means.

3. A variable timing system in accordance with claim 2 wherein:
   the message generation means of the communication means of the first apparatus at the first location operates under the prescribed conditions to generate message data including identification data identifying the first apparatus; and
   the second means of the extraction means of the second apparatus at the second location operates in response to the message data received by the first means from the first apparatus to detect the identification data in the message data and to thereupon extract from the second storage means the existing count data stored therein for incorporation in the message data to be transmitted to the first apparatus.

4. A variable timing system in accordance with claim 3 wherein:

the transmission medium interconnecting the first and second apparatus is a telephone network.

5. A variable timing system comprising:

first and second apparatus at first and second locations, respectively, and interconnected by a transmission medium for allowing bidirectional communication between the first and second apparatus;

said first apparatus at the first location comprising:

sensor means operative to monitor the occurrence of an associated activity and in response to monitoring the occurrence of the activity to produce a signal indicative of the occurrence of the activity;

first storage means operative to store count data therein having a value corresponding to a predetermined period of time;

activity timer means for storing count data therein;

processing means operative to receive and process each signal produced by the sensor means and in response thereto to cause the count data stored in the first storage means to be applied to and stored in the activity timer means;

means operative to alter count data transferred to the activity timer means so that the count data has a predetermined value at the expiration of a predetermined period of time; and communication means operative following the expiration of the predetermined period of time to establish communication with the second apparatus at the second location over the transmission medium;

said second apparatus at the second location comprising:

second storage means for storing count data therein having a value corresponding to a predetermined period of time;

means capable of varying the value of the count data within the second storage means to either increase its value or decrease its value thereby to correspond to an increased or decreased period of time, respectively;

extraction means operative following the establishing of communication with the second apparatus to extract from the second storage means the existing count data stored therein and to communicate this count data via the transmission medium to the first apparatus; and said first apparatus further comprising:

count receiving means operative to receive the count data from the second apparatus and to cause the count data to be applied to and stored in the first storage means, whereby if the value of the count data has been increased or decreased from a previous value the processing means operates in response to receiving and processing a signal produced by the sensor means to cause the count of increased or decreased value in the first storage means to be applied to the activity timer means.

6. A variable timing system in accordance with claim 5 wherein:

the communication means of the first apparatus at the first location includes message generation means operative following the expiration of the predetermined period of time associated with the activity timer means to generate message data and means operative to apply the message data to the transmission medium for transmission over the medium to the second apparatus;

the extraction means of the second apparatus at the second location includes first means arranged to receive the message data from the first apparatus, second means responsive to the first means and operative to extract from the second storage means the existing count data stored therein and to incorporate this count data in message data, and third means operative to apply the message data to the transmission medium for transmission over the medium to the first apparatus; and the count receiving means of the first apparatus includes receive means operative to receive the message data from the second apparatus and count extracting means responsive to the receive means and operative to extract the count data from the message data and to apply the count data to the first storage means to be then stored in the first storage means.

7. A variable timing system in accordance with claim 6 wherein:

the message generation means of the communication means of the first apparatus at the first location operates following the expiration of the predetermined period of time associated with the activity timer means to generate message data including identification data identifying the first apparatus; and the second means of the extraction means of the second apparatus at the second location operates in response to the message data received by the first means from the first apparatus to detect the identification data in the message data and to thereupon extract from the second storage means the existing count data stored therein for incorporation in the message data to be transmitted to the first apparatus.

8. A variable timing system in accordance with claim 7 wherein:

the means operative to alter the count data transferred to the activity timer means includes decrementing means operative to decrement the count data in the activity timer means at a predetermined rate.

9. A variable timing system in accordance with claim 8 wherein:

the transmission medium interconnecting the first and second apparatus is a telephone network.

10. A variable timing system comprising:

first and second apparatus at first and second locations, respectively, and interconnected by a transmission medium for allowing bidirectional communication between the first and second apparatus;

said first apparatus at the first location comprising:

sensor means operative to monitor the occurrence of predetermined first and second activities and in response to monitoring the occurrence of either activity to produce a signal indicative of the occurrence of the activity, said signal including activity data specifying the particular activity monitored by the sensor means;

first activity time storage means operative to store first and second data therein having a value corresponding to a predetermined first period of time;

second activity time storage means operative to store second count data therein having a value corresponding to a predetermined second period of time;

activity timer means for storing count data therein;

processing means operative to receive each signal produced by the sensor means and to examine the activity data in the signal to determine the particular activity monitored by the sensor means, said processing means being operative if the activity data in a received signal specifies the occurrence of the first activity monitored by the sensor means to cause the first count data stored in the first activity time storage means to be applied to and stored in the activity timer means, and operative if the activity data in a received signal specifies the occurrence of the second activity monitored by the sensor means to cause the second count data stored in the second activity time storage means to be applied to and stored in the activity timer means;

count control means operative to alter each first or second count data transferred to the activity timer means so that the count data has a predetermined corresponding value at the expiration of the corresponding period of time; and communication means operative following the expiration of either period of time associated with the activity timer means to establish communication with the second apparatus at the second location over the transmission medium;

said apparatus at the second location comprising:

count storage means for storing first and second count data therein having first and second values corresponding to first and second predetermined periods of time, respectively;

means capable of varying the values of either one or both of the count data within the count storage means to increase or decrease the values whereby the count data correspond to increased or decreased periods of time;

extraction means operative following the establishing of communication with the second apparatus to extract from the count storage means the existing first and second count data stored therein and to communicate the count data via the transmission medium to the first apparatus; and said first apparatus further comprising:

count processing means operative to receive the first and second count data from the second apparatus and to cause the first count data to be applied to and stored in the first activity time storage means and to cause the second count data to be applied to and stored in the second activity time storage means, whereby if the value of the first count data has been increased or decreased from a previous value the processing means operates in response to activity data in a received signal specifying the occurrence of a first activity monitored by the sensor means to cause the first count data of increase or decreased value in the first activity time storage means to be applied to the activity timer means, and whereby the processing means operates in response to activity data in a received signal specifying the occurrence of a second activity monitored by the sensor means to cause the second count data of increased or decreased value in the second activity time storage means to be applied to the activity timer means.

11. A variable timing system in accordance with claim 10 wherein:

the communication means of the first apparatus at the first location includes message generation means operative following the expiration of either of the predetermined periods of time associated with the activity timer means to generate message data and means operative to apply the message data to the transmission medium for transmission over the medium to the second apparatus;

the extraction means of the second apparatus at the second location includes first means arranged to receive the message data from the first apparatus, second means responsive to the first means and operative to extract from the count storage means the existing first and second count data stored therein and to incorporate the count data in the message data, and third means operative to apply the message data to the transmission medium for transmission over the medium to the first apparatus; and the count processing means of the first apparatus includes receive means operative to receive the message data from the second apparatus and count extracting means responsive to the receive means and operative to extract the first and second count data from the message data and to apply the first count data to the first activity time storage means and the second count data to the second activity time storage means.

12. A variable timing system in accordance with claim 11 wherein:

the message generation means of the communication means of the first apparatus at the first location operates following the expiration of either of the predetermined periods of time associated with the activity timer means to generate message data including identification data identifying the first apparatus; and the second means of the extraction means of the second apparatus at the second location operates in response to the message data received by the first means from the first apparatus to detect the identification data in the message data and to thereupon extract from the count storage means the existing first and second count data stored therein for incorporation into the message data to be transmitted to the first apparatus.

13. A variable timing system in accordance with claim 12 wherein:

the count control means operative to alter each first or second count data applied to the activity timer means includes decrementing means operative to decrement the count data in the activity timer means at a predetermined rate.

14. A variable timing system in accordance with claim 13 wherein:

the transmission medium interconnecting the first and second apparatus in a telephone network.

15. A variable timing system in accordance with claim 14 wherein the sensor means comprises:

object sensor means associated with a room and operative to monitor the entry and exit of an object from said room, said object sensor means being operative in response to monitoring the entry of an object into the room to produce a signal including data specifying the occurrence of the entry, and operative in response to monitoring the exit of an object from the room to produce a signal including data specifying the occurrence of the exit.

16. A variable timing system comprising:

first and second apparatus at first and second locations, respectively, and interconnected by a transmission medium for allowing bidirectional communication between the first and second apparatus;

said first apparatus at the first location comprising:

sensor means operative to monitor the occurrence of an associated activity and in response to monitoring the occurrence of the activity to produce a signal indicative of the occurrence of the activity;

pre-transmission storage means operative to store count data therein having a value corresponding to a predetermined period of time;

activity timer means arranged to store count data therein;

means operative to receive and process each signal produced by the sensor means and in response thereto to store count data of a predetermined value in the activity timer means and to cause the count data in the activity timer means to be altered at a predetermined rate;

communication control means operative to compare the count data in the pre-transmission storage means with the altered count data in the activity timer means and when the values of the count data bear a predetermined relationship to each other to establish communication with the second apparatus at the second location over the transmission medium;

said apparatus at the second location comprising:

storage means for storing count data therein having a value corresponding to a predetermined period of time;

means capable of varying the value of the count data in the storage means to either increase its value or decrease its value thereby to correspond to an increased or decreased period of time, respectively; and extraction means operative following the establishing of communication with the second apparatus to extract from the storage means existing count data stored therein and to communicate this count data via the transmission medium to the first apparatus; and said first apparatus further comprising:

count receiving means operative to receive the count data from the second apparatus and to cause the count data to be applied to and stored in the pre-transmission storage means, whereby if the value of the count data has been increased or decreased from a previous value the values of the count data compared by the communication control means achieve their predetermined relationship at a later or earlier time, respectively, whereby communication is established by the communication control means with the second apparatus at a later or earlier time, respectively.

17. A variable timing system in accordance with claim 16 wherein the sensor means comprises:

user-activated portable signaling means operative to monitor the occurrence of a user-initiated activity and in response to monitoring the activity to produce a signal indicative of the activity.

18. A variable timing system in accordance with claim 17 wherein:

the communication control means of the first apparatus at the first location includes message generation means operative following the compared count data achieving their predetermined relationship to generate message data and means operative to apply the message data to the transmission medium for transmission over the medium to the second apparatus;

the extraction means of the second apparatus at the second location includes first means arranged to receive the message data from the first apparatus, second means responsive to the first means and operative to extract from the storage means the existing count data stored therein and to incorporate this count data in message data, and third means operative to apply the message data to the transmission medium for transmission over the medium to the first apparatus; and the count receiving means of the first apparatus includes means operative to receive the message data from the second apparatus and count extracting means operative to extract the count data from the message data and to apply the count data to the pre-transmission storage means to be then stored in the first storage means.

19. A variable timing system in accordance with claim 18 wherein:

the message generation means of the communication control means of the first apparatus at the first location operates following the compared count data achieving their predetermined relationship to generate message data including identification data identifying the first apparatus; and the second means of the extraction means of the second apparatus at the second location operates in response to the message data received by the first means from the first apparatus to detect the identification data in the message data and to thereupon extract from the storage means the existing count data stored therein for incorporation in the message data to be transmitted to the first apparatus.

20. A variable timing system in accordance with claim 19 wherein:

the transmission medium interconnecting the first and second apparatus is a telephone network.

21. A variable timing system comprising:

first and second apparatus at first and second locations, respectively, and interconnected by a transmission medium for allowing bidirectional communication between the first and second apparatus;

said first apparatus at the first location comprising:

sensor means operative to monitor the occurrence of an associated activity and in response to monitoring the occurrence of the activity to produce a signal indicative of the occurrence of the activity;

activity time storage means operative to store first count data therein having a value corresponding to a predetermined first period of time;

pre-transmission storage means operative to store second count data therein having a value corresponding to a predetermined second period of time;

activity timer means for storing count data therein;

processing means operative to receive and process each signal produced by the sensor means and in response thereto to cause the first count data stored in the activity time storage means to be applied to and stored in the activity timer means;

count control means operative to alter each count data applied to the activity timer means so that the count data has a predetermined value at the expiration of the predetermined period of time;

means operative when the count data in the activity timer means has been altered to the aforesaid predetermined value to cause the count data in the activity timer means to be further altered at a predetermined rate;

communication control means operative to compare the count data in the pre-transmission storage means with the altered count data in the activity timer means and when the values of the count data bear a predetermined relationship to each other to establish communication with the second apparatus at the second location over the transmission medium;

said apparatus at the second location comprising:

storage means for storing first and second count data therein having first and second values corresponding to first and second predetermined periods of time, respectively;

means capable of varying the values of either one or both of the count data within the storage means to increase or decrease their values whereby the count data correspond to increased or decreased periods of time; and extraction means operative following the establishing of communication with the second apparatus to extract from the storage means the existing first and second count data stored therein and to communicate the count data via the transmission medium to the first apparatus; and said first apparatus further comprising:

count processing means operative to receive the first and second count data from the second apparatus and to cause the first count data to be applied to and stored in the activity time storage means and to cause the second count data to be applied to and stored in the pre-transmission storage means, whereby if the value of the first count data has been increased or decreased from a previous value the processing means operates in response to receiving and processing a signal produced by the sensor means to cause the count data of increased or decreased value in the activity time storage means to be applied to the activity timer means, and whereby if the value of the second count data has been increased or decreased from a previous value the values of count data compared by the communication control means achieve their predetermined relationship at a later or earlier time, respectively, whereby communication is established by the communication control means with the second apparatus occurs at a later or earlier time, respectively.

22. A variable timing system in accordance with claim 21 wherein:

the communication control means of the first apparatus at the first location includes message generation means operative following the compared count data achieving their predetermined relationship to generate message data and means operative to apply the message data to the transmission medium for transmission over the medium to the second apparatus;

the extraction means of the second apparatus at the second location includes first means arranged to receive the message data from the first apparatus, second means responsive to the first means and operative to extract from the storage means the existing first and second count data stored therein and to incorporate the count data into message data, and third means operative to apply the message data to the transmission medium for transmission over the medium to the first apparatus; and the count processing means of the first apparatus includes means operative to receive the message data from the second apparatus and count extracting means operative to extract the first and second count data from the message data and to apply the first count data to the activity time storage means and to apply the second count data to the pre-transmission storage means.

23. A variable timing system in accordance with claim 22 wherein:

the message generation means of the communication control means of the first apparatus at the first location operates following the compared count data achieving their predetermined relationship to generate message data including identification data identifying the first apparatus; and the second means of the extraction means of the second apparatus at the second location operates in response to the message data received by the first means from the first apparatus to detect the identification data in the message data and to thereupon extract from the storage means the existing first and second count data stored therein for incorporation into the message data to be transmitted to the first apparatus.

24. A variable timing system in accordance with claim 23 wherein:

the transmission medium interconnecting the first and second apparatus is a telephone network.

25. A variable timing system comprising:

first and second apparatus at first and second locations, respectively, and interconnected by a transmission medium for allowing bidirectional communication between the first and second apparatus;

said first apparatus at the first location comprising:

sensor means operative to monitor the occurrence of an associated activity and in response to monitoring the occurrence of the activity to produce a signal indicative of the occurrence of the activity;

pre-transmission storage means operative to store count data therein having a value corresponding to a predetermined pre-transmission period of time, said pre-transmission storage means being further operative to store flag data therein having a value specifying whether communication should be established with the second apparatus at the second location before or after the predetermined pre-transmission period of time;

activity timer means for storing count data therein;

processing means operative to receive and process each signal produced by the sensor means and in response thereto to produce a predetermined condition;

first means operative in response to the condition produced by the processing means to examine the value of the flag data in the pre-transmission means to determine whether communication should be established with the second apparatus at the second location before or after the predetermined pre-transmission period of time;

second means operative if the flag data in the pre-transmission means has a value specifying that communication with the second apparatus should be established before the predetermined pre-transmission period of time ot establish communication with the second apparatus over the transmission medium;

third means operative if the flag data in the pre-transmission means has a value specifying that communication with the second apparatus should be established after the predetermined pre-transmission period of time to cause count data of a predetermined value to be stored in the activity timer means and to cause the count data to be altered at a predetermined rate;

fourth means operative to compare the count data in the pre-transmission storage means with the altered count data in the activity timer means and when the values of the count data bear a predetermined relationship to each other corresponding to the expiration of the predetermined pre-transmission period of time to then establish communication with the second apparatus over the transmission medium;

said apparatus at the second location comprising:

storage means for storing count data therein having a value corresponding to a period of time and flag data having a value specifying whether communication is to be established by the first apparatus at the first location before or after the predetermined pre-transmission period of time associated with the pre-transmission means;

means capable of varying the value of the count data within the storage means to increase or decrease its values whereby the count data corresponds to an increased or decreased period of time, and of changing the value of the flag data; and extraction means operative following the establishing of communication with the second apparatus to extract from the storage means the existing count data and the flag data stored therein and to communicate the count data and the flag data via the transmission medium to the first apparatus; and said first apparatus further comprising:

count and data receiving means operative to receive the count data and the flag data from the second apparatus and to cause the count data and the flag data to be applied to and stored in the pre-transmission storage means, whereby if the value of the count data and/or the flag data have been altered from previous values communication is caused to be established with the second apparatus either before or after the altered period of time associated with the count data stored in the pre-transmission storage means.

26. A variable timing system in accordance with claim 25 wherein:

the second means includes first message generation means operative if the flag data in the pre-transmission means has a value specifying that communication with the second apparatus should be established before the predetermined pre-transmission period of time to generate message data, and means operative to apply the message data to the transmission medium for transmission over the medium to the second apparatus;

the fourth means includes second message generation means operative when the values of the altered count data in the activity timer means and the count data in the pre-transmission means bear the predetermined relationship to each other to generate message data, and means operative to apply the message data to the transmission medium for transmission over the medium to the second apparatus;

the extraction means of the second apparatus at the second location includes fifth means arranged to receive message data from the first apparatus, sixth means responsive to the fifth means and operative to extract from the storage means the existing count data and the flag data stored therein and to incorporate the count data and the flag data into message data, and seventh means operative to apply the message data to the transmission medium for transmission over the medium to the first apparatus; and the count and data receiving means of the first apparatus includes means operative to receive the message data from the second apparatus and count and data extracting means operative to extract the count data and the flag data from the message data and to apply the count data and the flag data to the pre-transmission storage means.

27. A variable timing system in accordance with claim 26 wherein:

the message generation means of the second means or the fourth means of the first apparatus at the first location operates when either the flag data in the pre-transmission means has a value specifying that communication should be established before the predetermined pre-transmission period of time or when the values of the altered count data in the activity timer means and the count data in the pre-transmission means bear the predetermined relationship to each other to generate message data including identification data identifying the first apparatus; and the sixth means of the extraction means of the second apparatus at the second location operates in response to message data received by the fifth means from the first apparatus to detect the identification data in the message data and to thereupon extract from the storage means the existing count data and the flag data stored therein for incorporation in the message data to be transmitted to the first apparatus.

28. A variable timing system in accordance with claim 27 wherein:

the transmission medium interconnecting the first and second apparatus is a telephone network.

29. A variable timing system comprising:

first and second apparatus at first and second locations, respectively, and interconnected by a transmission medium for allowing bidirectional communication between the first and second apparatus;

said first apparatus at the first location comprising;

timer means operative to store count data therein related to a predetermined period of time;

count control means operative to alter the count data stored in the timer means so as to have a predetermined value at the termination of the predetermined period of time;

communication means operative at or following the count data in the timer means being altered to its predetermined value to establish communication with the second apparatus at the second location over the transmission medium;

said apparatus at the second location comprising:

storage means for storing count data therein having a value corresponding to a predetermined period of time;

means capable of varying the value of the count data in the storage means to either increase its value or decrease its value thereby to correspond to an increased or decreased period of time, respectively; and extraction means operative following the establishing of communication with the second apparatus to extract from the storage means the existing count data stored therein and to communicate this count data via the transmission medium to the first apparatus; and said first apparatus further comprising:

count receiving means operative to receive the count data from the second apparatus and to cause the count data to be applied to and stored in the timer means.

30. A variable timing system in accordance with claim 29 wherein:

the timer means is operative to store count data therein related to a predetermined period of time which represents a time of day; and the storage means of the second apparatus is operative to store count data therein having a value related to a predetermined period of time which represents a time of day.

31. A variable timing system in accordance with claim 29 wherein:

the communication means at the first apparatus at the first location includes message generation means operative at or following the count data in the timer means being altered to its predetermined value to generate message data and means operative to apply the message data to the transmission medium for transmission over the medium to the second apparatus;

the extraction means of the second apparatus at the second location includes first means arranged to receive the message data from the first apparatus, second means responsive to the first means and operative to extract from the storage means the existing count data stored therein and to incorporate the count data into message data, and third means operative to apply the message data to the transmission medium for transmission over the medium to the first apparatus; and the count receiving means of the first apparatus includes receive means operative to receive the message data from the second apparatus and count extracting means responsive to the receive means and operative to extract the count data from the message data and to apply the count data to the timer means.

32. A variable timing system in accordance with claim 31 wherein:

the message generation means of the communication means at the first apparatus at the first location operates at or following the count data in the timer means being altered to its predetermined value to generate message data including identification data identifying the first apparatus; and the second means of the extraction means of the second apparatus at the second location operates in response to the message data received by the first means from the first apparatus to detect the identification data in the message data and to thereupon extract from the storage means the count data stored therein for incorporation into the message data to be transmitted to the first apparatus.

33. A variable timing system in accordance with claim 32 wherein:

the transmission medium interconnecting the first and second apparatus is a telephone network.

* * * * *